Oct. 22, 1935. E. REINER ET AL 2,018,090
VEHICLE
Filed June 22, 1932 6 Sheets-Sheet 2
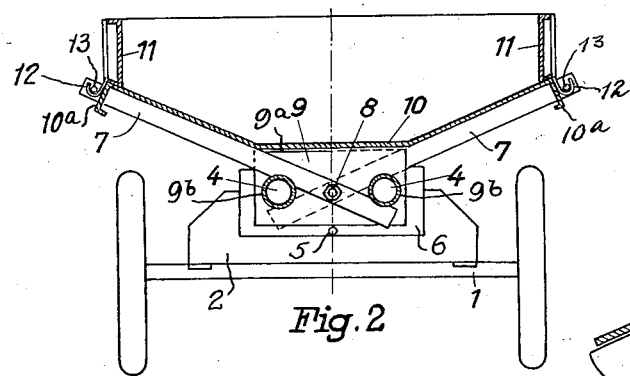
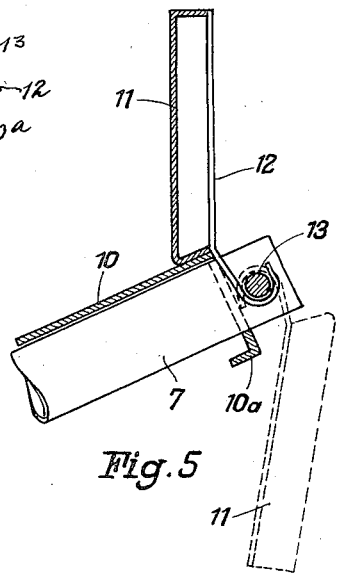
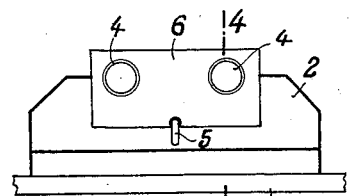
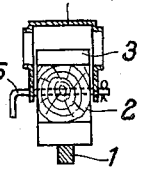
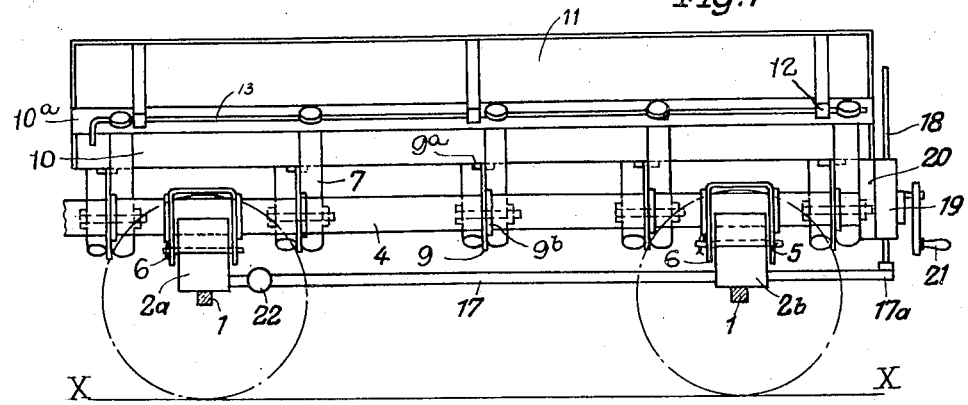
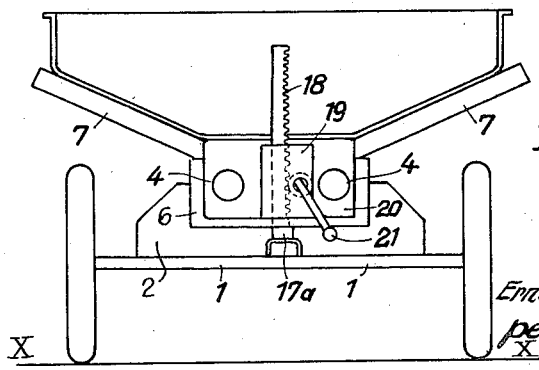
Inventors
Ernst Reiner & Arnold Hüper
per: Sydney E. Page
ATTORNEY

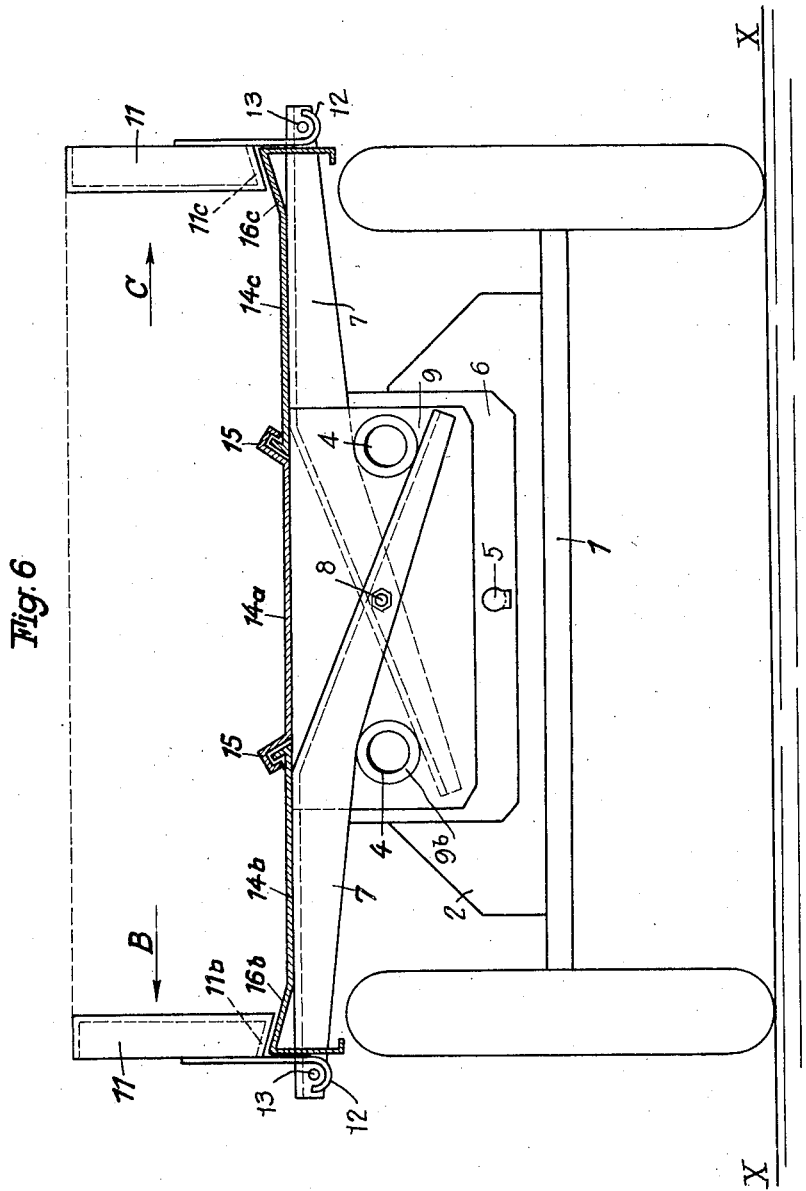

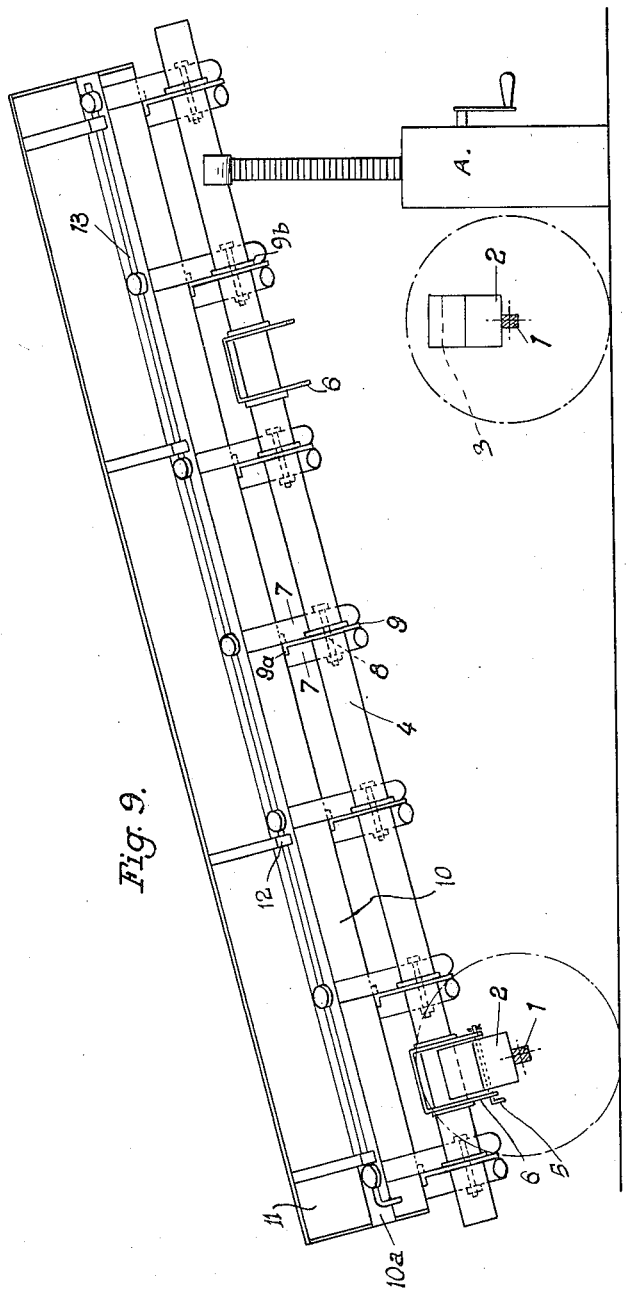

Oct. 22, 1935.  E. REINER ET AL  2,018,090
VEHICLE
Filed June 22, 1932  6 Sheets-Sheet 5
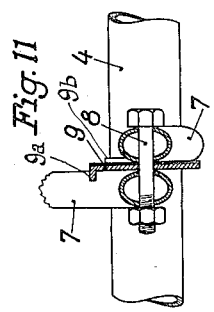
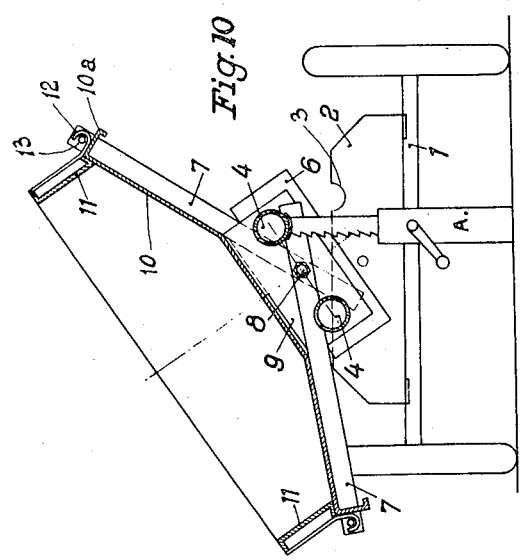
Inventors:
ERNST REINER & ARNOLD HÜPER
per Sydney B. Page
Attorney.

Oct. 22, 1935.  E. REINER ET AL  2,018,090
VEHICLE
Filed June 22, 1932   6 Sheets-Sheet 6
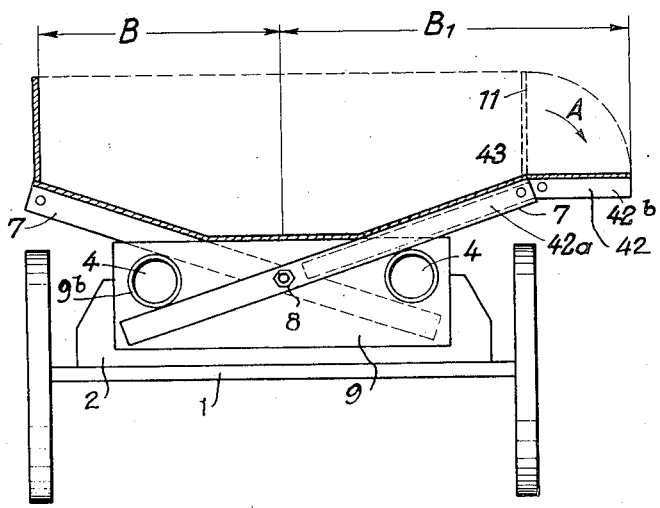
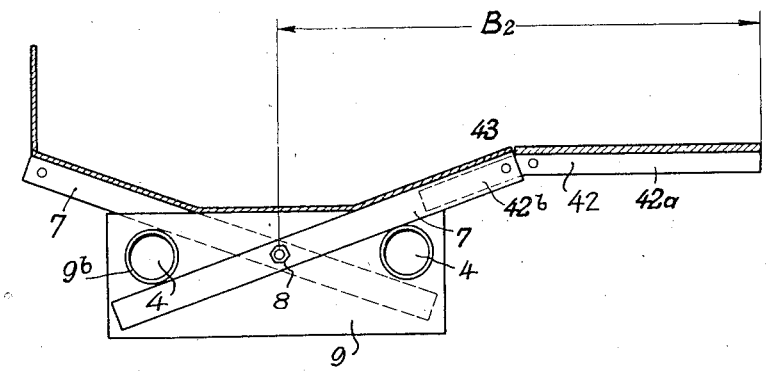
Inventors
Ernst Reiner & Arnold Hüper
PER  Sydney E. Page
ATTORNEY Patented Oct. 22, 1935

2,018,090

UNITED STATES PATENT OFFICE 2,018,090

VEHICLE

Ernst Reiner and Arnold Hüper, Zeesen, near Konigswusterhausen, Germany

Application June 22, 1932, Serial No. 618,654
In Germany June 29, 1931

15 Claims. (Cl. 298—18)

This invention relates to vehicles and more particularly to wheeled vehicles for carrying granular material, such as sand, ballast and the like.

Hitherto, the platform for carrying the material has been mounted on transverse supports secured to longitudinal supports carried by the wheels.

The object of the invention is to provide means for moving the transverse supports longitudinally on the longitudinal supports.

A further object is to provide means for tilting the platform laterally.

Another object is to provide means for tilting the platform rearwardly.

A still further object is to provide means for increasing the capacity of the vehicle.

These and other objects of the invention will be more fully pointed out in the following description taken in conjunction with the accompanying drawings.

In the drawings:—

Fig. 2 shows a section on the line 2—2 of Fig. 1,

Fig. 3 shows a rear view of an axle,

Figure 1:
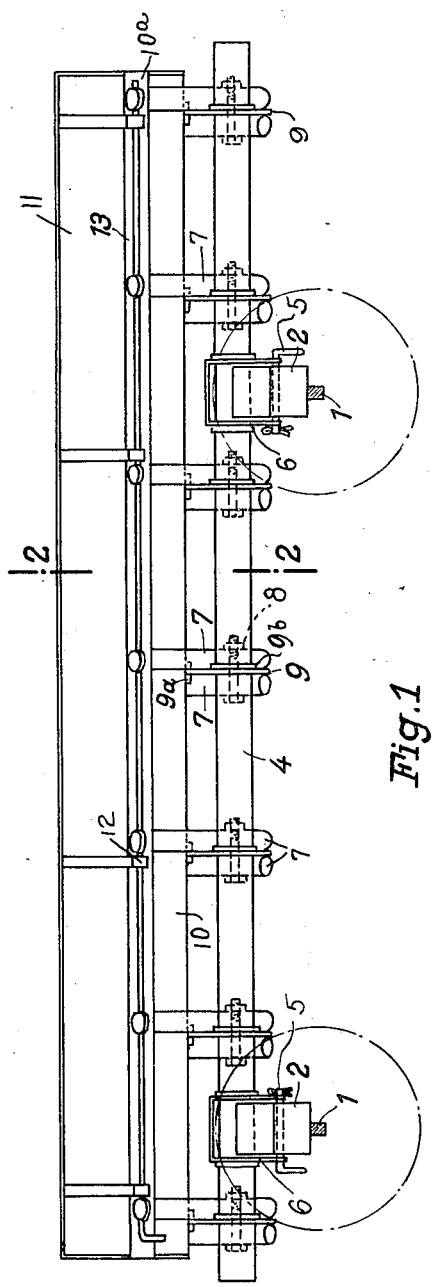
Fig. 1 shows a side elevation of the vehicle.

Fig. 4 is a section on the line 4—4 of Fig. 3, with the longitudinal support omitted, Fig. 5 is an enlarged view of a portion of the platform of the vehicle shown in Fig. 2, Fig. 6 shows a section similar to Fig. 2 but to a larger scale of another form of construction, Fig. 7 shows in side elevation a vehicle with a tilting device, Fig. 8 shows an end view of a tilting vehicle but with a different type of body, Fig. 9 shows an end view of the vehicle tilted laterally, Fig. 10 shows a side elevation of the vehicle tilted to the rear, Fig. 11 is an enlarged view of the manner of pivoting the transverse supports, Figs. 12 and 13 show a device for widening the loading surface, or increasing the capacity of the vehicle.

Throughout the drawings the line X—X indicates the level on which the vehicle rests.

The vehicle is provided with two axles 1, on which are mounted transverse members 2, provided with semi-circular recesses 3 (see particularly Fig. 4) for the reception of longitudinal supports 4. The longitudinal supports 4 are preferably constructed in the form of tubes and are secured to the transverse members 2 by U-shaped metal bearing members 6 which embrace the transverse members 2 and are secured to these by means of detachable bolts 5 retained in place by split pins.

On the longitudinal supports 4 are fitted a plurality of pairs of transverse supports 7 each pair being pivoted together by a bolt 8 and crossed in the form of shears so as to embrace and rest on the longitudinal supports 4, as shown in Fig. 2. As shown in Fig. 11 between two transverse supports 7 forming a pair is located a plate 9, also carried by the longitudinal supports 4 and through which the bolt 8 passes, such plates supporting the transverse supports 7 on each side vertically, thus permitting them to move slightly in the vertical plane, as when the vehicle is passing over rough ground a certain amount of distortion occurs between the several parts.

Prior to the fitting of a platform 10 of the type having flanges 10a, to the wheel part of the vehicle, each pair of transverse supports is slid on to the longitudinal supports 4 and each pair is then shifted to a suitable position to support the platform 10 hereinafter described and in order that their ends may project through the holes in the flanges 10a. The platform is then fitted to the longitudinal and transverse supports. When a body of this type has been fitted and the transverse supports assembled in position, the transverse supports do not shift along the longitudinal supports 4. In the case of a platform or body (such as Figure 8) not provided with the flanges 10a the pairs of transverse supports are shiftable along the longitudinal supports to suitable positions to support such a platform.

In order to assist in the easy movement of the pairs of transverse supports 7 along the longitudinal supports 4, flanges 9b are provided round the holes in the plates 9 through which the longitudinal supports 4 pass.

Each of the plates 9, which may be flanged laterally at the top at 9a, supports the middle portion of a platform 10 (see Fig. 2), of which the ends rest on the transverse supports 7. The platform 10 (Fig. 5) is at the end bent in the form of a U, and the transverse supports 7, which are preferably of tubular shape, pass through openings in the bent portion 10a and carry a shaft 13 on which the side walls 11 of the vehicle are pivotally attached by means of hooks 12; in Fig. 5 the broken lines show the wall 11 suspended downwardly. The end of the platform 10 is bent in the form of a U or V for the purpose of stiffening.

It will be seen that by removing both the bolts 5 that the bearing members 6 carrying the transverse supports 7 and the longitudinal supports 4, may be tilted by means of a jack A about one or other of the longitudinal supports 4 pivoting in the recesses 3 in the transverse members 2 as clearly shown in Fig. 9, and thus permits any load on the platform 10 being discharged laterally of the vehicle.

If it is desired to tilt the vehicle rearwardly the forward bolt 5 is movable and the vehicle is raised at the forward end, as shown in Figure 9, by means of the jack A which is placed under both the longitudinal supports 4.

Fig. 6 shows a form of construction wherein the transverse supports 7 are bent in such a manner that the vehicle platform 14a, 14b, 14c—which is flat—is located horizontally. The parts 14c and 14b are connected to the part 14a by flanging 15, and at the outer end the plates 14b, 14c are bent upwardly to provide inclined surfaces 16b and 16c which co-operate with inclined surfaces 11b and 11c on the lower ends of the side walls 11 respectively, and prevent the latter tilting downwardly when pressure is exerted thereon by the granular loading material in the direction indicated by the arrows B and C; thus the material is prevented from falling out.

Fig. 7 shows in side elevation a vehicle, wherein transverse members 2a, 2b on the axles are connected together by a rod 17, on the front end 17a of which there bears the rack 18 of a vehicle winch. On a supporting member 20, embracing the longitudinal supports 4 is mounted a casing 19 in which casing is mounted a toothed wheel, co-operating with the rack 18 and capable of being rotated by the crank 21, whereby the longitudinal supports 4 and thus the vehicle can be tilted rearwardly, after the bolt 5 on the front axle has been released so that the plate 6 is lifted from the transverse member 2b. The vehicle is thus tilted about the rear axle 1 and as the two axles of the vehicle turn relatively to one another, a universal joint 22 is included in the connecting rod 17 adjacent the rear axle. The rod 17 may be extended for a suitable distance beyond the front axle so that the loading surface of the vehicle may be thus extended beyond the front axle.

Fig. 12 shows a device for increasing the loading width of the vehicle. Into the transverse support 7, which is preferably tubular, there is fitted an extension member 42, which is preferably also tubular, either so that the short arm 42b projects from the tube 7, see Fig. 12, or so that the long arm 42a projects from the tube 7. In this manner the loading surface of the vehicle is increased in the first case from the arrow B to the arrow B' (Fig. 12), or in the second case, to the arrow B₂ (Fig. 13). The side walls 11 can in the first case be folded downwardly in the direction of the arrow A so that it rests upon the arm 42b. The member 42 is connected to the tube 7 by a bolt 43.

What we claim is:—

1. In a vehicle and in combination, a platform, longitudinal members carried by the axles of the vehicles, a plurality of pairs of transverse supporting bars for the platform, each pair of bars crossed in the form of shears and inserted between the longitudinal members, a joint plate between the bars of each pair of transverse supporting bars holding said members in spaced relationship, and a pin connection through each pair of supporting bars and the joint plate between them.

2. In a vehicle and in combination, a platform, tubular longitudinal members carried by the axles of the vehicle, a plurality of pairs of slidable transverse supports for the platform, each pair crossed in the form of shears and inserted between the tubular longitudinal members, a joint plate between the members of a pair of transverse supports, and a pin connection through a pair of supports and the plate between them, and bearings for the tubular longitudinal member whereby the platform can be tilted laterally.

3. In a vehicle according to claim 2, lateral flanges at the top of the joint plate forming a support for the middle portion of the platform.

4. A wheeled vehicle comprising in combination with wheel axles, a platform, longitudinal members carried by the said axles, a plurality of pairs of transverse supporting bars crossed in the form of shears, and inserted between the longitudinal members, a joint plate between the bars of each pair of transverse supporting bars holding said members in spaced relationship, a pin connection for each pair of transverse bars connecting the latter to the associated joint plate, and securing means for the platform, the transverse supports being positioned on the longitudinal members for the reception of the platform, the securing means holding the platform on the said transverse supporting bars.

5. A wheeled vehicle comprising in combination with wheel axles, longitudinal supports mounted on the said axles, a platform with outside depending flanges, pairs of pivoted transverse supports, the outer ends of which pass through openings in the said flanges, the said transverse supports being crossed in the form of shears to embrace and rest on the said longitudinal supports, a joint plate between each pair of transverse supports and a pin connection for each pair of supports, connecting the latter to the associated joint plate.

6. A wheeled vehicle comprising in combination with wheel axles, bearings secured to the said axles, tubular longitudinal supports rotatably mounted in the said bearings, a platform with outside depending flanges, pairs of pivoted transverse supports, the outer ends of which pass through openings in the said flanges, the said transverse supports being crossed in the form of shears to embrace and rest on the said longitudinal supports, a joint plate between each pair of transverse supports and a pin connection for each pair of supports, connecting the latter to the associated joint plate.

7. In combination with a wheeled vehicle according to claim 6, lateral flanges at the top of each joint plate forming a support for the middle portion of the platform.

8. A wheeled vehicle comprising in combination with wheel axles, transverse members mounted on the said axles, U-shaped bearing members embracing the said transverse members, tubular longitudinal supports mounted in the said bearing members and so as to rotate in recesses in the said transverse members, detachable securing means connecting the said bearing members to the said transverse members, a platform with outside depending flanges, pairs of pivoted transverse supports, the outer ends of which pass through openings on the said flanges, the said transverse supports being crossed in the form of shears to embrace and rest on the said longitudinal supports, a joint plate between each pair of transverse supports, and a pin connection for each pair of supports, connecting the latter to the associated joint plate.

9. In combination with a wheeled vehicle according to claim 5, longitudinal rods mounted on the said outer ends of the transverse supports, and side walls to the said platform hingedly mounted on the said rods.

10. A wheeled vehicle comprising in combination with wheel axles, transverse members mounted on the said axles, U-shaped bearing members embracing the said transverse members, tubular longitudinal supports mounted in the said bearing members and so as to rotate in recesses in the said transverse members, detachable securing means connecting the said bearing members to the said transverse members, a platform with outside depending flanges, pairs of pivoted transverse supports, the outer ends of which pass through openings in the said flanges, the said transverse supports being crossed in the form of shears to embrace and rest on the said longitudinal supports, a joint plate between each pair of transverse supports, a pin connection for each pair of supports, connecting the latter to the associated joint plate, lateral flanges at the top of each joint plate forming a support for the middle portion of the platform, longitudinal rods mounted on the said outer ends of the transverse supports, and side walls to the said platform hingedly mounted on the said rods.

11. A wheeled vehicle comprising in combination with wheel axles, longitudinal supports mounted on the said axles, a flat platform with outside depending flanges, pairs of pivoted transverse supports crossed in the form of shears to embrace and rest on the said longitudinal supports, horizontal extensions to the said transverse supports passing through openings in the said flanges, a joint plate between each pair of transverse supports and a pin connection for each pair of supports, connecting the latter to the associated joint plate.

12. In combination with a wheeled vehicle according to claim 11, inclined side flanges to the platform, longitudinal rods mounted in the said horizontal extensions adjacent the said inclined flanges, side walls to the said platform hingedly mounted on the said rods, the lower ends of the said side walls being inclined to rest on the said inclined flanges of the platform when in the vertical position.

13. In combination with a vehicle wheel according to claim 5, a flexible rod connecting the said axles, a rack mounted at one end of the vehicle on the said flexible rod, and a winding device co-operating with the said rack and secured to the said longitudinal supports whereby the vehicle may be tilted longitudinally about one axle.

14. A wheeled vehicle comprising in combination with wheel axles, bearings secured to the said axles, tubular longitudinal supports rotatably mounted in the said bearings, a platform with outside depending flanges, pairs of pivoted transverse supports, the outer ends of which pass through openings in the said flanges, the said transverse supports being crossed in the form of shears to embrace and rest on the said longitudinal supports, a joint plate between each pair of transverse supports and a pin connection for each pair of supports, connecting the latter to the associated joint plate, a flexible rod connecting the said axles, a rack mounted at one end of the vehicle on the said flexible rod and a winding device co-operating with the said rack and secured to the said longitudinal supports whereby the vehicle may be tilted longitudinally about one axle.

15. In combination with a wheeled vehicle according to claim 4, extension members slidably mounted in the outer ends of the said transverse supporting bars, side walls for the said platform hingedly connected to the said outer ends so as to be dropped to rest on the said extension members when in the extended position, and means securing the said extension members in a particular position.

ERNST REINER.
ARNOLD HÜPER.